(12) United States Patent
Gross et al.

(10) Patent No.: US 10,662,108 B2
(45) Date of Patent: May 26, 2020

(54) RECOVERY OF FIBERS REINFORCED POLYMERS WITH LEWIS BASES

(71) Applicant: The Boeing Company, Chicago, IL (US)

(72) Inventors: Adam F. Gross, Santa Monica, CA (US); April R. Rodriguez, Santa Monica, CA (US); Ashley M. Nelson, Los Angeles, CA (US); John J. Vajo, West Hills, CA (US); Hardik Dalal, Seattle, WA (US); Panagiotis Emanuel George, Lake Tapps, WA (US); Xin N. Guan, Monterey Park, CA (US); James Hillard Davis, Jr., Mobile, AL (US)

(73) Assignee: The Boeing Company, Chicago, IL (US)

( * ) Notice: Subject to any disclaimer, the term of this patent is extended or adjusted under 35 U.S.C. 154(b) by 59 days.

(21) Appl. No.: 15/280,471

(22) Filed: Sep. 29, 2016

(65) Prior Publication Data

US 2018/0086639 A1    Mar. 29, 2018

(51) Int. Cl.
| | | |
|---|---|---|
| C03C 13/00 | (2006.01) | |
| C08J 11/28 | (2006.01) | |
| C08J 11/26 | (2006.01) | |
| C01B 32/05 | (2017.01) | |

(52) U.S. Cl.
CPC .............. *C03C 13/00* (2013.01); *C01B 32/05* (2017.08); *C08J 11/26* (2013.01); *C08J 11/28* (2013.01); *C08J 2363/00* (2013.01); *Y02W 30/706* (2015.05)

(58) Field of Classification Search
CPC ........ C08J 11/26; C08J 11/28; C08J 2363/00; B29B 17/02; C01B 31/02; C03C 13/00
See application file for complete search history.

(56) References Cited

U.S. PATENT DOCUMENTS

| | | | | |
|---|---|---|---|---|
| 5,246,647 A | * | 9/1993 | Beck | B01D 53/228 264/184 |
| 5,264,520 A | * | 11/1993 | Mullins | C07C 45/46 528/125 |
| 7,456,140 B2 | * | 11/2008 | Small | C09K 13/08 134/1.3 |
| 2010/0112518 A1 | * | 5/2010 | Engelbrecht | A61K 6/0085 433/167 |

(Continued)

FOREIGN PATENT DOCUMENTS

| | | |
|---|---|---|
| CN | 102 731 821 | 10/2012 |
| CN | 102 391 543 | 5/2013 |

OTHER PUBLICATIONS

Xu et al "Chemical Recycling of Carbon Fiber/Epoxy Composites in a Mixed Solution of Peroxide Hydrogen and N,N-Dimethylformamide", Composites Science and Technology, 82 (2013) pp. 54-59.*

(Continued)

*Primary Examiner* — Frances Tischler
(74) *Attorney, Agent, or Firm* — McDonnell Boehnen Hulbert & Berghoff LLP

(57) ABSTRACT

A composition comprising a Lewis base containing depolymerization liquid and methods of using the Lewis base depolymerization liquid to depolymerize the polymer component of fiber reinforced polymers to form free fibers.

23 Claims, 6 Drawing Sheets

(56) References Cited

U.S. PATENT DOCUMENTS

2011/0065817 A1* 3/2011 Van Weynbergh ...... C08J 11/02
521/46.5
2014/0023581 A1 1/2014 Adam
2018/0105641 A1* 4/2018 Ando ..................... C08G 63/80

OTHER PUBLICATIONS

Extended European Search Report prepared by the European Patent Office in application No. 17189832.3, dated Jan. 4, 2018.
Oliveux, Geraldine, et al., "Degradation of a Model Epoxy Resin by Solvolysis Routes", Polymer Degradation and Stability 118 (2015) 96-103.
Deng, Tiansheng, et al., "Cleavage of C—N bonds in Carbon Fiber/Epoxy Resin Composite", Green Chem., 2015, 17, 2141-2145.
Boyle, Maureen A., et al., "Epoxy Resins", 78-89, 2001.
Kamimura, Akio, et al., "An Efficient Method to Depolymerize Polyamide Plastics: A New Use of Ionic Liquids", Organic Letters, 2007, vol. 9, No. 13, 2533-2535.
Ma, Jijia, et al., "A Parametric Study of the Recyclability of Carbon Fiber Reinforced Polymers", SAMPE Conference Proceedings, Long Beach, CA, May 23-26, 2016, Society for the Advancement of Material and Process Engineering.
Nie, Weidong, et al., "Decomposition of Waste Carbon Fiber Reinforced Epoxy Resin Composites in Molten Potassium Hydroxide", Polymer Degradation and Stability 111 (2015) 247-256.

* cited by examiner

RECOVERY OF FIBERS REINFORCED POLYMERS WITH LEWIS BASES

FIELD

This invention concerns the use of at least one Lewis base having a boiling point of at least 150° C. at one atmosphere of pressure to recover free fibers from fiber reinforced polymers.

BACKGROUND

Fiber reinforced polymers (FRPs) are widely used to create structural elements and parts used in aerospace, automotive, watercraft, sporting goods, and civil/structural engineering applications among others. FRPs are strong, light-weight materials with high strength-to-weight ratios. FRPs typically are formed by combining fibers and an uncured binding polymer and then curing the binding polymer. Some non-limiting examples of FRPs include carbon fiber reinforced polymers and glass fiber reinforced polymers.

The wide use of FRPs has led to waste disposal issues and a demand for FRP recycling. Three general recycling methods that disrupt the polymer matrix have been used: mechanical, thermal, and chemical recycling. Mechanical FRP recycling uses mechanical methods such as grinding to convert large FRP pieces into small pieces and particles, ultimately resulting in resin-rich powders and very small fibers. A problem with mechanical recycling is that the polymer cannot be separated from the fibers and fiber length cannot be controlled. As a result, recovered fibers are of little value.

Thermal FRP recycling typically entails pyrolyzing FRPs in a controlled oxygen environment at very high temperatures to combust the polymer and leave recoverable fibers. Because pyrolysis requires very high temperatures, recovered fibers are often weakened and charred during the recycling process.

Chemical recycling converts the polymer portion of recycled FRPs into oligomers or monomers either through depolymerizing the polymer matrix via a process requiring supercritical or near-supercritical pressure, or through the use of ionic liquids at atmospheric pressure. At supercritical pressures, chemical recycling is expensive and dangerous. Additionally, ionic liquids that are capable of depolymerizing FRPs are expensive and susceptible to degradation through oxidation and ionization.

The volume of FRP's entering the waste stream from, for example, aircraft decommissioning and printed circuit board disposal is expected to grow. In addition, the value of the FRP fiber components such as carbon fibers can be quite high if they can be recovered in useful amounts and lengths. Therefore, there is a need for environmentally friendly and inexpensive FRP recycling process that can recover salable fibers.

SUMMARY

An aspect of this invention is a method for recovering free fibers from a fiber reinforced polymer comprising: admixing a fiber reinforced polymer with a Lewis base to form a recycle admixture wherein the Lewis base has a boiling point of at least 150° C. at one atmosphere and; heating the recycle admixture to a temperature greater than 150° C. and less than the boiling point of the Lewis base a for a period of time sufficient to at least partially depolymerize a portion of the fiber reinforced polymer to yield free fiber.

Still another aspect of this invention is the use of a Lewis base having a boiling point of at least 150° C. at one atmosphere of pressure to recover free fibers from a fiber reinforced polymer.

Yet another aspect of this invention is a depolymerization liquid comprising a Lewis base having a boiling point of at least 150° C. at one atmosphere and that resists ionization into cations and anions.

DETAILED DESCRIPTION

Figure 1:
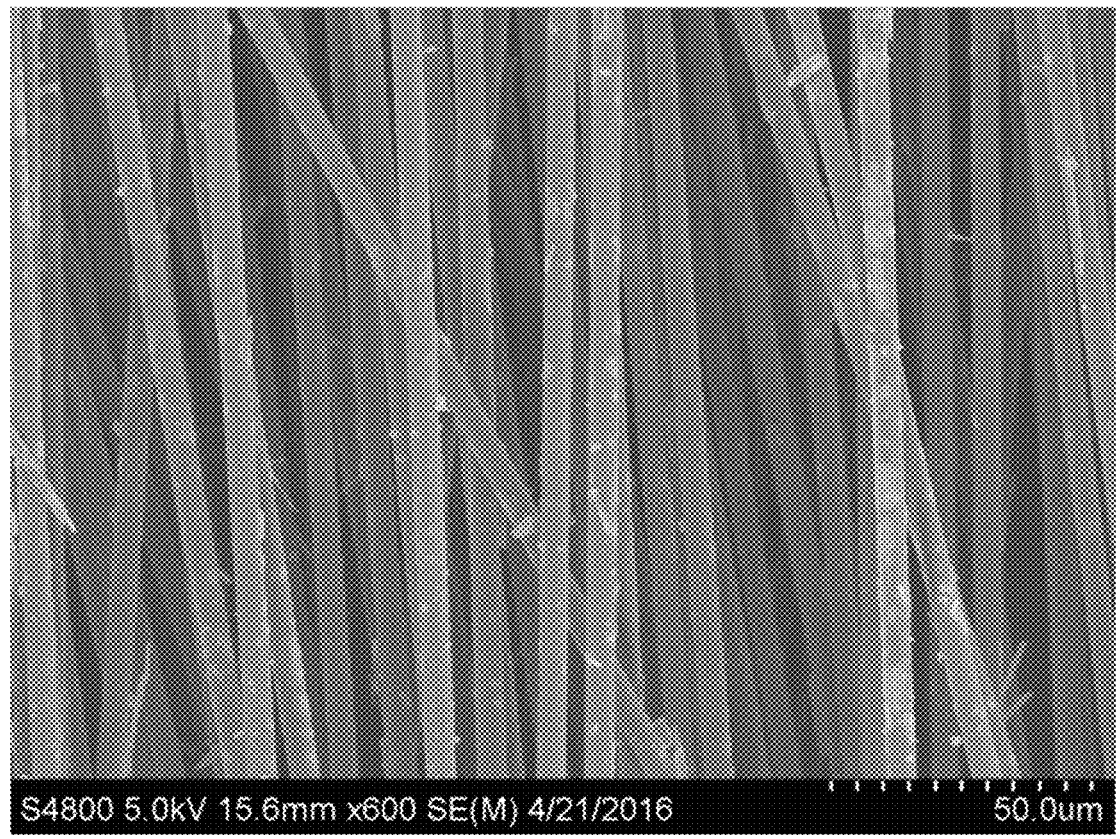
FIG. 1. A Scanning Electron Microscope (SEM) image of recovered carbon fibers after triphenylphosphine sulfide treatment of carbon fiber reinforced polymer (CFRP) at 350° C. for 10 minutes according to Example 1.

The present invention relates to methods for recovering fibers from fiber reinforced polymers with a Lewis base as well as the use of a Lewis base to recover fibers from polymer-based fiber reinforced composites.

The term "optionally substituted," is used below to refer to a molecule or compound that may be either (1) unsubstituted or (2) substituted at one or more substitutable positions. If a substitutable position is not substituted, the default substituent is hydrogen.

The methods and uses of this invention employ one or more Lewis bases to depolymerize or otherwise decompose the polymer portion of fiber reinforced polymers "FRPs". A "Lewis base" refers to a compound that can donate a pair of electrons to an electron acceptor (Lewis acid) to form a Lewis adduct. The bond formed in a Lewis acid/base reaction is a non-permanent bond called a coordinate covalent bond. The useful Lewis bases can be solids or liquids at room temperature. However, the depolymerization liquids used in the methods of this invention all include Lewis bases in their liquid state.

One class of useful Lewis bases are neutral Lewis bases. A neutral Lewis bases is an uncharged compound with nonbonding electrons that can be donated to an electron acceptor but that do not absorb ions. A neutral Lewis base resists ionization making it less prone to being consumed when it reacts with a matrix polymer thereby reducing the likelihood that decomposed matrix polymer will be altered by the decomposition process.

Some useful Lewis bases include, but are not limited to $NH_3$, $RNH_2$, $R_2NH$, $R_3N$, ROH, RCOOH, RSH, and $PR_3$ where R is alkyl, alkenyl, or phenyl.

Lewis base carboxylic acids are another class of useful Lewis bases. Lewis base carboxylic acids donate one of the lone pairs of electrons on the carbonyl. In water or other solvents, carboxylic acids ionize, act as traditional Bronstead acids and are generally susceptible to nucleophilic attack. Non-limiting examples of useful Lewis base carboxylic acids include one or more of the following:

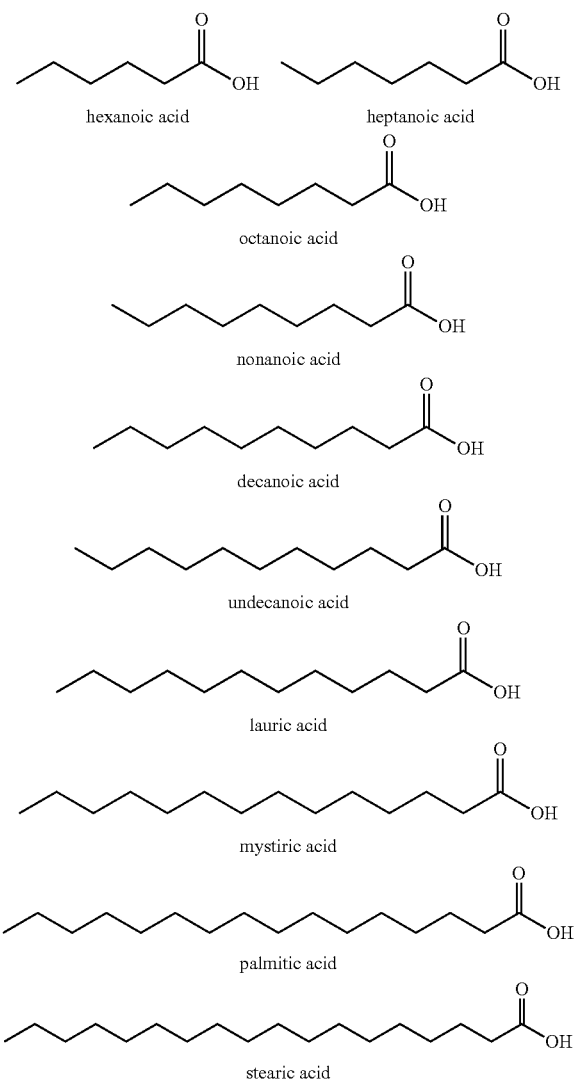

and combinations of these Lewis base carboxylic acids wherein the Lewis base carboxylic acid(s) may be substituted with one or more substituents selected from halogen, nitrate, sulfonic acid, phenyl, alkenyl, alkyl, and aldehyde.

Still other useful Lewis bases include one or more of following compounds:

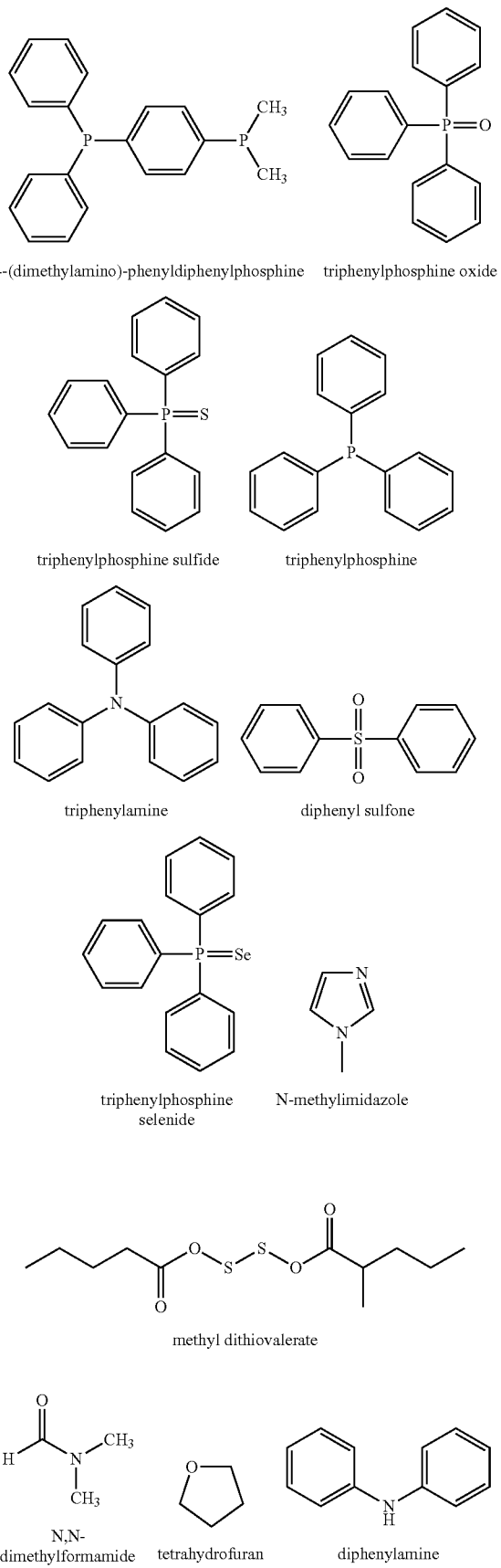

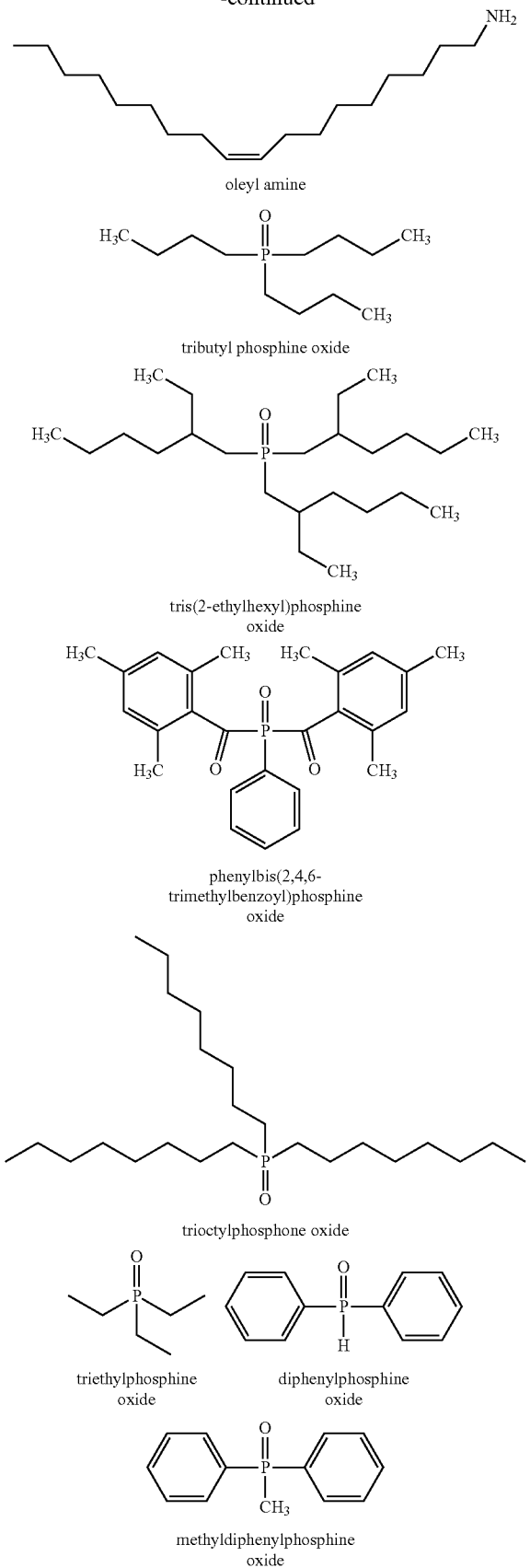

as well as diphenyl sulfide, diphenyl sulfoxide and Lawesson's reagent, each of which may be substituted with one or more substituents selected from halogen, nitrate, sulfonic acid, alkyl, alkenyl, phenyl and aldehyde.

The term "alkenyl" as used herein refers to an unsubstituted hydrocarbon chain radical having from 2 to 8 carbon atoms, preferably from 2 to 4 carbon atoms, and having at least including one olefinic double bond, e.g. vinyl, allyl, and the like. Alkenyl substituents may optionally be substituted with 1-3 substituents chosen from alkyl, carboxy, carboxyalkyl, aminocarbonyl, alkoxy and cyano each having from 1 to 6 carbon atoms; $CF_3$; amino; and $—S(O)_nR$, where R is alkyl, aryl, or heteroaryl and n is 0, 1 or 2.

The term "alkyl" as used herein denotes a linear or branched acyclic alkyl radical containing from 1 to about 15 carbon atoms. In some embodiments, alkyl is a lower alkyl having from 1 to 10 carbons atoms, or more narrowly from 1 to 6 carbon atoms or even more narrowly from 1 to 3 carbon atoms. Examples of alkyl moieties include, but are not limited to methyl, ethyl, propyl, isopropyl, butyl, isobutyl and tert-butyl. Alkyl substituents may optionally be substituted with 1-3 substituents chosen from alkyl, carboxy, carboxyalkyl, aminocarbonyl, alkoxy and cyano each having from 1 to 6 carbon atoms; $CF_3$; amino; and $—S(O)_nR$, where R is alkyl, aryl, or heteroaryl and n is 0, 1 or 2.

The term "phenyl" as used herein refers to unsubstituted phenyl or phenyl substituted with halogen, nitrate, sulfonic acid, phenyl, propyl, methyl, ethyl, alkenyl, alkyl and aldehyde. Phenyl substituents may optionally be substituted with 1-3 substituents chosen from alkyl, carboxy, carboxyalkyl, aminocarbonyl, alkoxy and cyano each having from 1 to 6 carbon atoms; $CF_3$; amino; and $—S(O)_nR$, where R is alkyl, aryl, or heteroaryl and n is 0, 1 or 2.

The term "aldehyde" as used herein refers to a compound containing one or more aldehyde (—CHO) groups such as formaldehyde, paraformaldehyde, glutaraldehyde and glyoxal. Aldehyde substituents may optionally be substituted with 1-3 substituents chosen from alkyl, carboxy, carboxyalkyl, aminocarbonyl, alkoxy and cyano each having from 1 to 6 carbon atoms; $CF_3$; amino; and $—S(O)_nR$, where R is alkyl, aryl, or heteroaryl and n is 0, 1 or 2.

Useful Lewis bases will have a boiling point of at least 150° C. at one atmosphere pressure. In an alternative embodiment, the Lewis base will have a boiling point of at least 200° C. at one atmosphere pressure. In still another alternative embodiment, the Lewis base will have a boiling point of at least 325° C. at one atmosphere pressure. These boiling point thresholds apply to single Lewis bases and compounds created by combining two or more Lewis bases.

Lewis bases can be used to depolymerize a variety of matrix materials. For example, triphenylphosphine is somewhat useful in depolymerizing epoxy amine CFRP's while triphenylphosphine sulfide and diphenyl sulfone are more effective in depolymerizing epoxy amine CFRP. This contrasts with triphenylphosphine oxide which is effective in depolymerizing epoxy amine CFRP and epoxy in fiberglass.

The methods of this invention are useful for recovering fibers from fiber-reinforced polymers. Fiber reinforced polymers ("FRPs") are composite materials comprising at least two parts, a matrix material and a reinforcing material where the reinforcing material is a fiber. The reinforcing material gives the FRP strength while the matrix material binds the reinforcing material. Fiber-reinforced polymers include a variety of reinforcing materials such as fibers made from carbon, glass, aromatic polyamides (aramids), aluminum, ultra-high-molecular-weight polyethylene, graphite, and combinations of these. This invention is not limited by the type of fiber reinforcing material that is used in the FRP.

Carbon fiber reinforced polymers (CFRPs) are a species of fiber reinforced polymer materials in which reinforcing materials are carbon fibers. CFRPs also include carbon nanotube reinforced polymers which include carbon fibers as a reinforcing material and further include carbon nanotubes as a matrix filler. In this invention embodiment, the carbon fibers and carbon nanotubes can separately be recovered via the recycling process.

The matrix material or polymer used in FRP's can be any polymer—thermosetting or thermoplastic—that are known or found to be useful in fabricating FRP's. The matrix materials are generally thermosetting resins such as epoxy resins as well as thermoset or thermoplastic polymers, such as polyester, vinyl ester, phenol formaldehyde resins and nylon resins.

One aspect of the invention is a method of recycling FRPs to recover reinforcing material fibers and to optionally recover filler material(s). The method includes combining FRP's with a Lewis base containing depolymerization liquid to at least partially decompose the fiber-reinforced polymer matrix material. The useful Lewis bases will be selected from one or more of those described above that have a boiling point of at least 150° C. at one atmosphere and that are preferably neutral Lewis bases. The terms "decompose" and "depolymerize" are used to refer to the change in matrix material that occurs as the result of contacting the FRP with a Lewis base containing depolymerization liquid. Upon contacting the FRP with a Lewis base at the recited temperature, the Lewis base is believed to disrupt the matrix material cross-linking thereby incrementally reducing the molecular size of the polymer to the point that part to all of the fiber reinforcement can be separated from the "decomposed" or "depolymerized" matrix material as free fiber.

Before recycling, the FRP's may be size reduced. Many FRP's are quite large and reducing the FRP's to a size at which they can easily be combined with a Lewis base containing depolymerization liquid in a recycling vessel might be necessary. However, the value of recycled free fibers obtained from the recycling process may increase as their size increases. So FRP size reduction might be minimal or unnecessary.

The combination of FRP's with a Lewis base containing depolymerization liquid forms a recycle admixture. The recycle admixture is heated to a temperature that is greater than 150° C. and below the Lewis base boiling point. The admixture is held at the elevated temperature for a period of time that is sufficient to at least partially decompose the polymer matrix portion of the FRP to form an at least partially decomposed polymer and to liberate free fibers. The length of time that the admixture remains at an elevated temperature will depend upon a variety of factors including the chosen Lewis base(s), the type of matrix material that is being decomposed and admixture temperature. Typically the admixture will be held at the elevated temperature for at least 10 minutes and up to 3 hours or more. In one alternative, the admixture will be held at an elevated temperature for at least 10 minutes and up to 120 minutes.

The temperature to which the Lewis base containing recycle admixture is heated and maintained will depend upon a variety of factors including the type of polymer that is used in the FRP. For example, FRPs used in the automotive industry employ lower cost polymers with lower average molecular weights. These FRP's can be successfully depolymerized by Lewis base containing recycle admixtures heated to at least 150° C. In contrast, FRPs used in the aviation industry, e.g., CFRPs, typically include polymers with high average molecular weights, high glass transition temperatures, and/or a high degree of cross linking which can require heating a Lewis base containing recycle admixture to a temperature of at least 325° C. to successfully recover free fibers from the CFRPs. Therefore, the minimum temperature of the Lewis base containing recycle admixture will be greater than 150° C. and below the Lewis base boiling point. In another aspect, the Lewis base containing recycle admixture is heated to a temperature of at least 200° C. and in still another aspect the Lewis base containing recycle admixture is heated to a temperature of at least 325° C.

Free fibers are separated from the Lewis base containing recycle admixture any time after the polymer matrix becomes at least partially decomposed. Free fibers can be separated while the Lewis base containing recycle admixture is at an elevated temperature, while the admixture is being cooled or after the admixture is cooled to about room temperature or below. The "free fibers" are those fibers that become disengaged from the FRP as a result of contacting the FRP with the Lewis base containing depolymerization liquid.

Free fibers can include residual decomposed polymer. Therefore, after separating free fibers from the recycle admixture, the free fibers may be washed one or more times with a wash solvent to remove at least some to all of any residual decomposed polymer associated with the free fiber. The wash solvent can be any liquid or solution in which the decomposed polymer is soluble or that can otherwise remove residual decomposed polymer from the free fiber. Examples of useful wash solvents include acetone, tetrahydrofuran, ethyl acetate, toluene, methanol, ethanol, propanol, isopropyl alcohol, n-butanol, t-butanol, and compatible mixtures thereof.

In one embodiment, free fiber is separated from the recycle admixture while it is at the elevated temperature to yield a partially spent Lewis base containing depolymerization liquid. A second piece of FRP can then be placed in the partially spent Lewis base containing depolymerization liquid to form a second recycle admixture. Fresh Lewis base may be added to the partially spent Lewis base containing depolymerization liquid either before or after the second FRP is placed into the liquid and the depolymerization process is repeated with the second piece of FRP.

The partially spent Lewis base containing depolymerization liquid may be used multiple times—with or without the addition of fresh Lewis base between uses—to sequentially depolymerize a plurality of FRP's. However, over time, decomposed polymer can accumulate in the Lewis base containing depolymerization liquid causing the Lewis base containing depolymerization liquid to become spent and loose its effectiveness in decomposing matrix polymer. When this occurs, the spent Lewis base containing depolymerization liquid is disposed of and the process resumes with fresh Lewis base.

In still another embodiment, the at least partially spent Lewis base containing recycle admixture and free fibers can be combined with a wash solvent to yield a wash product before. The free fiber may remain in the wash product for a period of time that is sufficient to at least partially remove residual polymer from the free fibers. The free fibers are then separated from the wash product. Separated free fibers can optionally be washed one or more times with a wash solvent as described above to remove additional residual polymer. The wash solvent can be optionally recovered from the wash product by heating the wash product to a temperature sufficient to volatilize the wash solvent. The recovered wash solvent can be reused while the remaining recovered non-volatile Lewis base containing depolymerization liquid—including decomposed polymer—can be separately reused.

In a further embodiment, the Lewis base is separated from at least a portion of the decomposed polymer in the at least partially spent Lewis base containing depolymerization liquid by admixing the at least partially spent Lewis base containing depolymerization liquid with a Lewis base solvent. A Lewis base solvent is a solvent in which the Lewis base is soluble and in which the decomposed polymer is partially to totally insoluble. Examples of useful Lewis base solvents include non-polar and aprotic solvents such as hexane, cyclohexane, methyl tert-butyl ether and mixtures thereof.

In still another embodiment, decomposed polymer is separated from the Lewis base containing partially spent depolymerization liquid by admixing the at least partially spent Lewis base containing depolymerization liquid with a decomposed polymer solvent. A decomposed polymer solvent is a solvent in which the decomposed polymer is soluble and in which the Lewis base is partially to totally insoluble. Examples of decomposed polymer solvents include one or more of ketones, alkenes, haloalkanes, and ethers and more narrowly one or more of methyl ethyl ketone, methyl amyl ketone, tetrahydrofuran (THF), diethyl ether, methylene chloride, acetone, chloroform, toluene and compatibly mixtures thereof.

In another embodiment, the Lewis base is extracted from the at least partially spent Lewis base containing depolymerization liquid or from the wash product with a Lewis base precipitant. A Lewis base precipitant selectively precipitates the Lewis base and not the decomposed polymer. Examples of Lewis base precipitants include methanol, water and a methanol/water combination.

In yet another embodiment, the decomposed polymer is extracted from the at least partially spent Lewis base containing depolymerization liquid or from the wash product with a decomposed polymer precipitant. The decomposed polymer precipitant selectively precipitates the decomposed polymer and not the Lewis base. Examples of useful decomposed polymer precipitants include alkanes, alkenes, and ethers and more preferably, one or more of hexane, octane, toluene, xylene, benzene, diphenyl ether and compatible combinations thereof.

FRP's may include additives other than fibers such as inert fillers. Examples of inert fillers include carbon nanotubes, silica particles, PTFE particles, boron nitride, titanium dioxide and other known FRP fillers. FRP fillers can be costly, thus making their recovery economically viable. Like the reinforcing materials, the fillers are inert and can be recovered from FRP's by the methods described above.

The Lewis bases used in the Lewis base containing depolymerization liquids can have a variety of origins. The Lewis base can be fresh (unused). It can take the form of at an least partially spent Lewis base containing depolymerization liquid including decomposed polymer. The Lewis base can also be the product of separating Lewis base from decomposed polymer in an at least partially spent Lewis base containing depolymerization liquid. Moreover, at least a portion to all of the Lewis base in the Lewis base containing depolymerization liquid may be recycled from a previous use.

EXAMPLES

Example 1

In this example, 5 g of the neutral Lewis base triphenylphosphine sulfide was combined with a 1 cm×1 cm piece of 16-ply-thick CFRP and the admixture was heated under a nitrogen gas atmosphere to 350° C. to form a Lewis base containing recycle admixture. The Lewis base containing recycle admixture was held at 350° C. for 10 minutes. Following heating, the CFRP had depolymerized to form a free fiber component and decomposed polymer. The Lewis base containing recycle admixture was cooled to room temperature and then combined with acetone to form a wash product including the neutral Lewis base and decomposed polymer. Free carbon fibers were recovered by separating the carbon fibers from the wash product and then washing the separated free fiber three times with acetone. The acetone wash product, including the dissolved neutral Lewis base and decomposed polymer, was heated to evaporate the acetone to yield neutral Lewis acid and decomposed polymer. The recovered carbon fibers were free of polymer and were of a useful size, at least 6 mm in length. A scanning electron microscope image of the clean recovered carbon fibers is shown in FIG. 1.

Example 2

Figure 2:
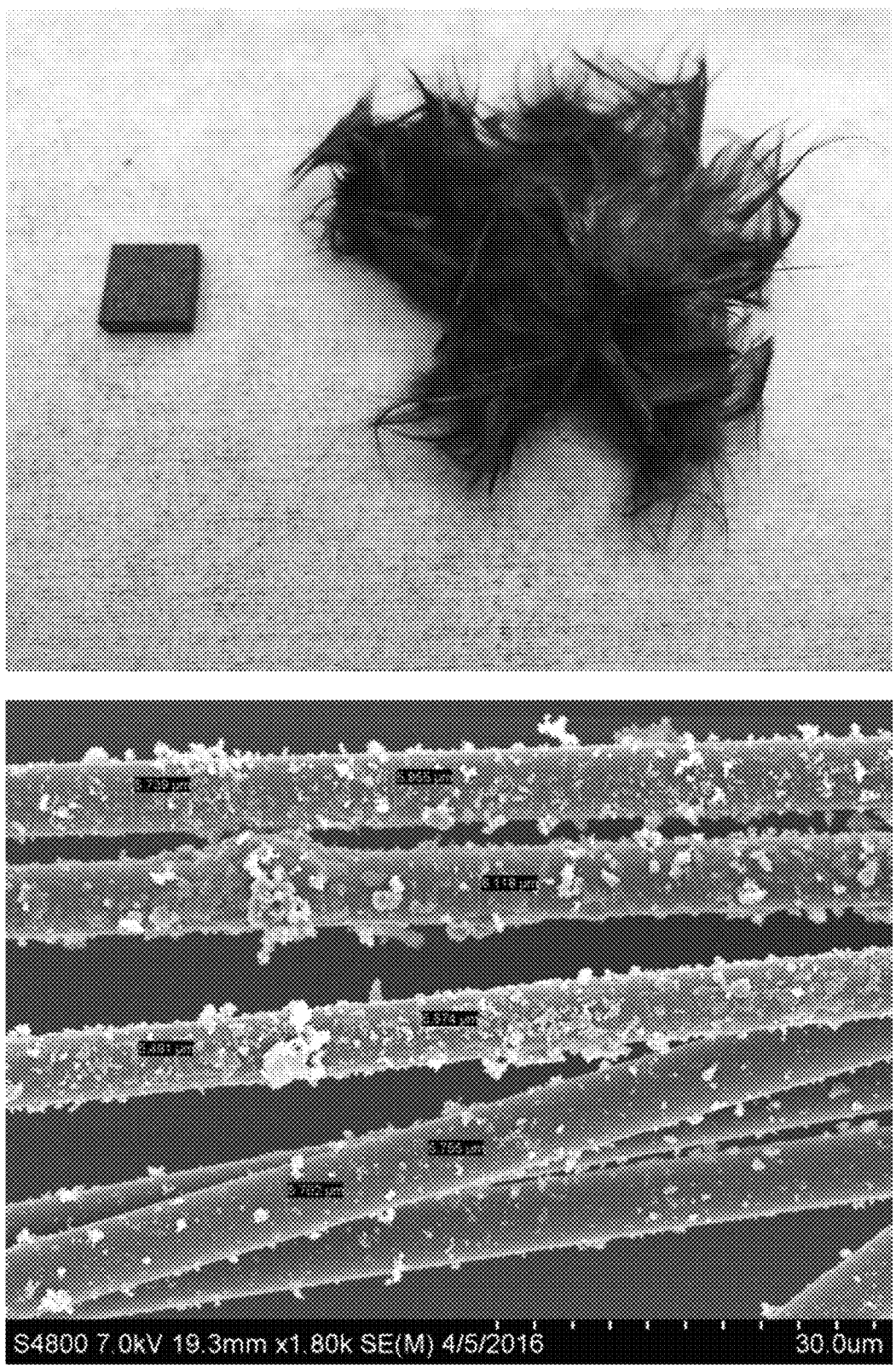
FIG. 2. Top: An image of the starting CFRP sample and carbon fibers recovered after heating 16 ply thick CFRP with triphenylphosphine oxide at 350° C. for 10 minutes according to Example 2. Bottom: AN SEM image of post-process recovered carbon fibers including residue on the carbon fiber surfaces.

In this example, 5 g of the neutral Lewis base triphenylphosphine oxide was combined with a 1 cm×1 cm piece of 16-ply CFRP and the admixture was heated to 350° C. to form a Lewis base containing recycle admixture. The temperature of the admixture was maintained at 350° C. for 10 minutes under $N_2$ gas. Following heating, the matrix portion of the CFRP had depolymerized to form a free fiber component and decomposed polymer. The recycle admixture was cooled to room temperature and washed with acetone to form a wash product including dissolve neutral Lewis base and decomposed polymer. Free carbon fibers were recovered from the wash product and then washed three times with acetone. The remaining acetone wash product, including the dissolved neutral Lewis base and decomposed polymer, was heated to evaporate the acetone to yield neutral Lewis base and decomposed polymer. The recovered carbon fibers contained more residue than those recovered in Example 1. The amount of residue is evident when comparing FIG. 1 (using triphenylphosphine sulfide) with FIG. 2, which shows the fibers are recovered with triphenylphosphine oxide as the Lewis base. As with Example 1 above, the recovered fibers were at least 6 mm in length.

Example 3

In this example, 5 g of the neutral Lewis base triphenylphosphine oxide was combined with a 1 cm×1 cm piece of 16-ply-thick CFRP was combined with 5 g of triphenylphosphine oxide and the admixture was heated under a nitrogen gas atmosphere to 350° C. to form a Lewis base containing recycle admixture. The temperature of the admixture was maintained at 350° C. for 20 minutes. Following heating, the CFRP had depolymerized to form a free fiber component and decomposed polymer. The recycle admixture was cooled to room temperature and washed with acetone to form a wash product including dissolved triphenylphosphine oxide and decomposed polymer. Free fibers were recovered from the wash product and washed three times with acetone. The wash product, including the acetone, triphenylphosphine oxide and decomposed polymer, was heated to evaporate the acetone to yield triphenylphosphine oxide and decomposed polymer. The recovered free carbon fibers contained less residue than those recovered in Example 2 using the same Lewis base, but heated for just 10 minutes instead of 20 the minutes as in this example.

Figure 3:
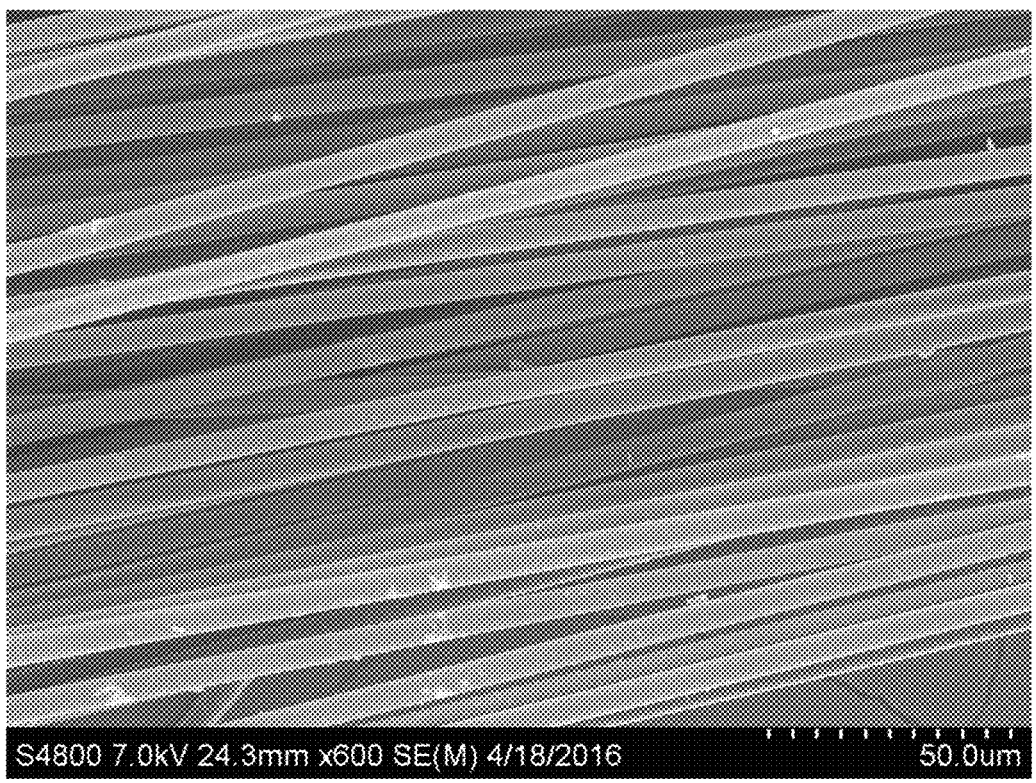
FIG. 3. An SEM image of post-process recovered carbon fibers after heating 16 ply thick CFRP with triphenylphosphine oxide for 350° C. for 20 minutes according to Example 3.
Figure 4:
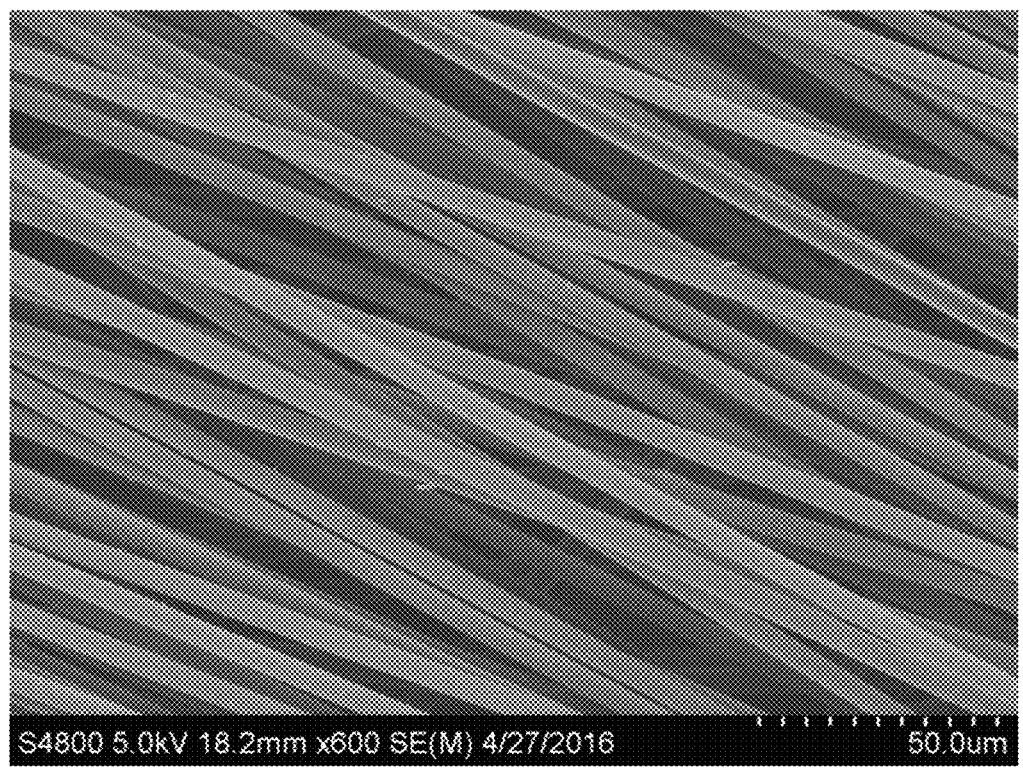
FIG. 4. An SEM image of post-process recovered carbon fibers after heating 32 ply thick CFRP with triphenylphosphine oxide for 350° C. for 20 minutes.

FIG. 3 shows the recovered free carbon fibers. The recovered free carbon fibers were clean and essentially free of residue. The results of this example demonstrate that Lewis base strength and reaction times are variables that can be adjusted to produce clean residue-free fibers. Moreover, a $^{31}$P NMR of the recovered triphenylphosphine oxide demonstrated that triphenylphosphine oxide did not decompose under the heating conditions of this example.

Example 4

In this example, 5 g of the neutral Lewis base triphenylphosphine oxide was combined with a 1 cm×1 cm piece of 16-ply-thick CFRP and heated to 350° C. to form a Lewis base containing recycle admixture. The temperature of the admixture was maintained at 350° C. for 20 minutes in air. Following heating, the CFRP had depolymerized to yield a free fiber component and decomposed polymer. The recycle admixture was cooled to room temperature and then combined with acetone to form a wash product including dissolved phenylphosphine oxide and decomposed polymer. Free fibers were separated from the wash product and washed three times with acetone. The wash product was heated to evaporate the acetone, yielding triphenylphosphine oxide and decomposed polymer. The recovered carbon fibers contained less residue than those recovered using the same Lewis base but heated for 10 minutes instead of 20 minutes as in Example 2 above. $^{31}$P NMR of the recovered triphenylphosphine oxide showed slight decomposition (0.8% decomposition).

Example 5

Figure 5:
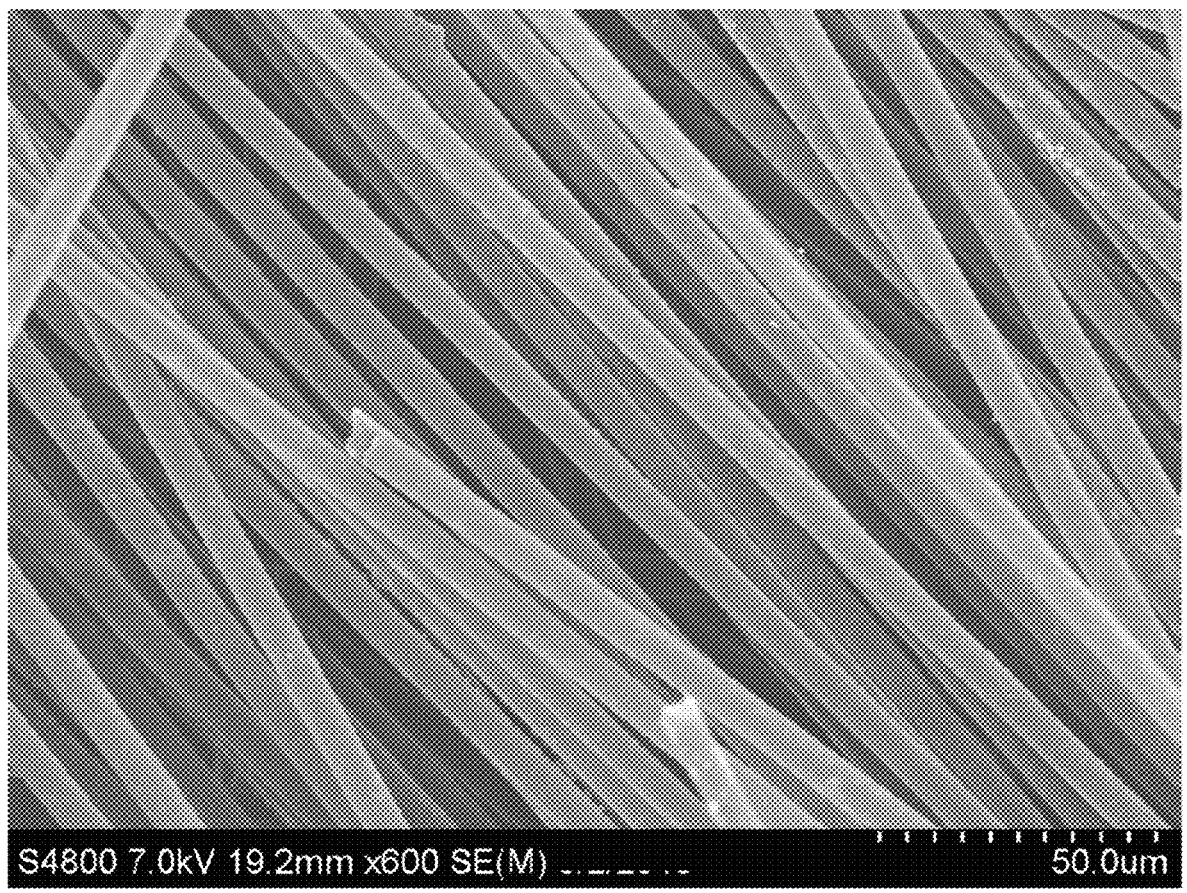
FIG. 5. An SEM image of post-process recovered carbon fibers after heating 8 ply thick CFRP with triphenylphosphine oxide for 350° C. for 20 minutes according to Example 5.

In this example, 5 g of the neutral Lewis base triphenylphosphine oxide was combined with a 1 cm×1 cm piece of 8-ply-thick CFRP and heated to 350° C. to form a Lewis base containing recycle admixture. The temperature of the admixture was maintained at 350° C. for 20 minutes in N$_2$ gas. After heating, the CFRP had depolymerized to yield fiber components and decomposed polymer. The recycle admixture was cooled to room temperature and combined with acetone to form a wash product including dissolved triphenylphosphine oxide and decomposed polymer. Free fibers were separated from the wash product and then washed three times with acetone. The wash product was heated to evaporate the acetone, yielding triphenylphosphine oxide and decomposed polymer. The recovered free fibers were at least 6 mm in length. FIG. 5 shows an SEM image of the free carbon fibers recovered in Example 5 that show the fibers are residue free.

Example 6

In this example, 5 g of the neutral Lewis base diphenyl sulfone was combined with a 1 cm×1 cm piece of CFRP and heated to 350° C. to form a Lewis base containing recycle admixture. The temperature of the admixture was maintained at 250° C. for 20 minutes in N$_2$ gas. Following heating, the CFRP had depolymerized to yield fiber components and decomposed polymer. The admixture was cooled to room temperature and combined with acetone to form a wash product including dissolved diphenyl sulfone and decomposed polymer. Free fibers were separated from the wash product and washed three times with acetone. The wash product was heated to evaporate the acetone, yielding diphenyl sulfone and decomposed polymer. The recovered fibers were at least 6 mm in length.

Example 7

Figure 6:
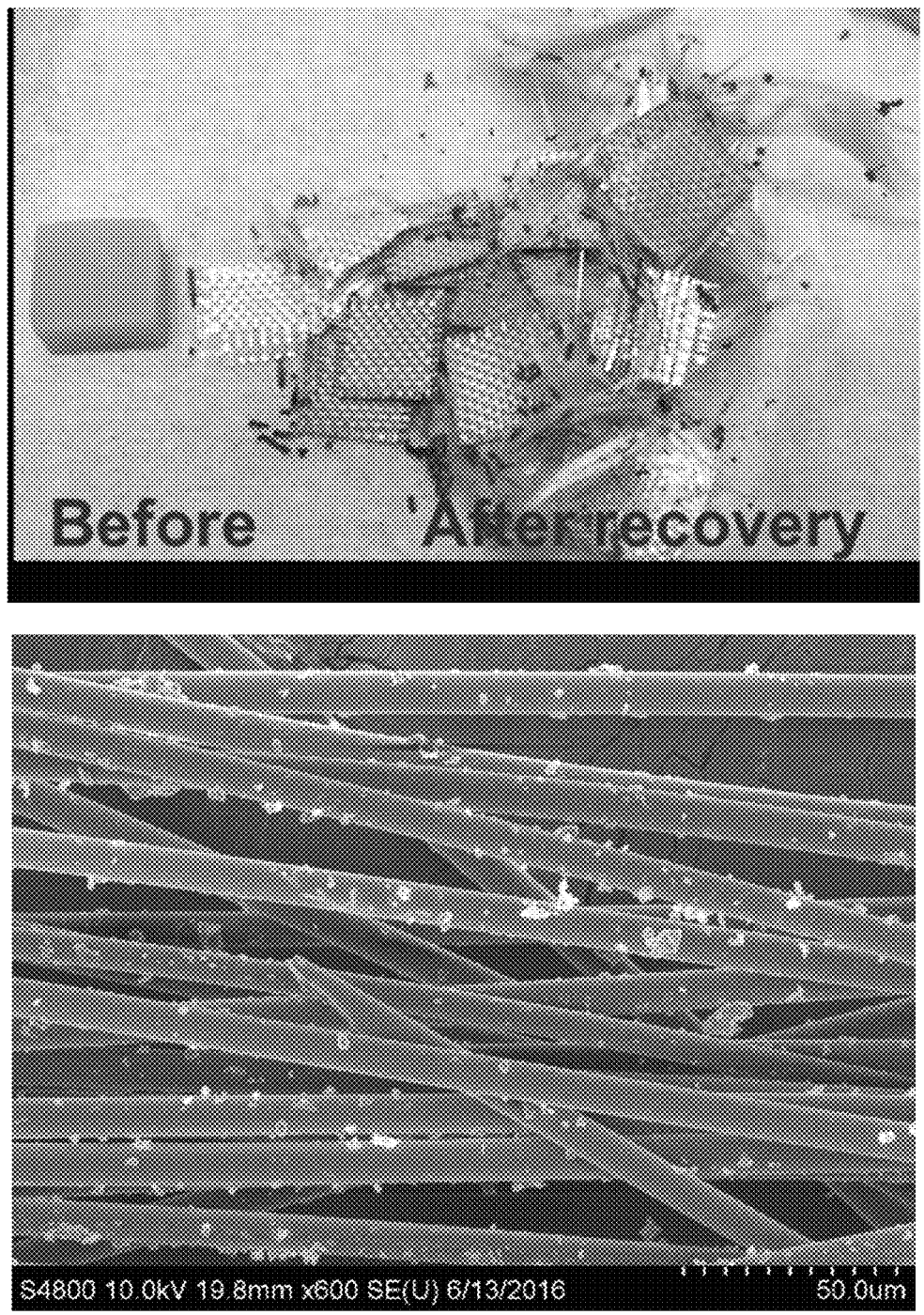
FIG. 6. Top: An image of the starting G-10 Garolite sample and material recovered with triphenylphosphine oxide after heating to, and maintaining at, 350° C. for 20 minutes according to Example 7. Bottom: An SEM image of post-process recovered glass fibers with some resin particles on the surface according to Example 7.

In this example, 5 g of the neutral Lewis base triphenylphosphine oxide was combined with a piece of 1 cm×1 cm, ¼" thick Garolite G-10 fiberglass and heated to 350° C. to form a Lewis base containing recycle admixture. The admixture was maintained at 350° C. for 20 minutes in N$_2$ gas. Following heating, the Garolite G-10 fiberglass had depolymerized to yield fiber components and decomposed polymer. The recycle admixture was cooled to room temperature and combined with acetone to form a wash product including dissolved diphenyl sulfone and decomposed polymer. Free fibers were removed from the acetone solution and washed three times with acetone. The wash product was heated to evaporate the acetone yielding diphenyl sulfone and decomposed polymer. FIG. 6 shows the recovered glass fibers as individual fibers and woven sheets in an image before and after depolymerization as well as an SEM of glass fibers with minor residue.

Example 8

Figure 7:
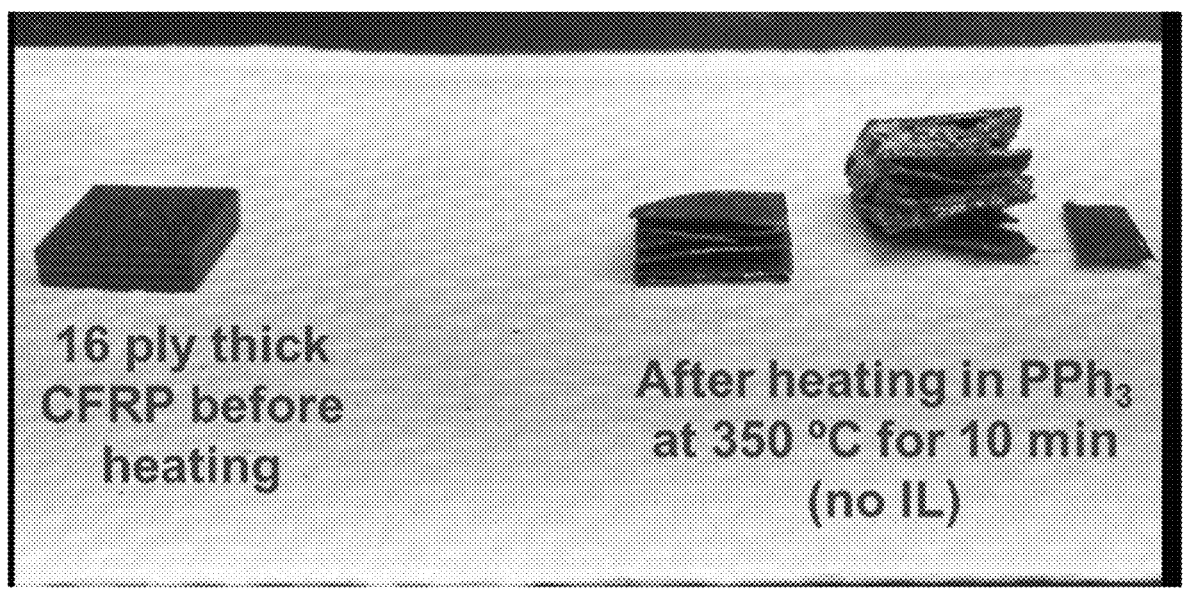
FIG. 7. A 16 ply thick CFRP shown before and after treatment with triphenylphosphine at 350° C. for 10 minutes.

In this example, 5 g of the neutral Lewis base hexanoic acid is combined with a 1 cm×1 cm piece of 16-ply-thick CFRP and the admixture is heated under a nitrogen gas atmosphere to 150° C. to form a Lewis base containing recycle admixture. The Lewis base containing recycle admixture is held at 150° C. for a period of time sufficient to at least partially depolymerize the CFRP to form free fibers and decomposed polymer. The Lewis base containing recycle admixture is cooled to room temperature and then combined with acetone to dissolve the neutral Lewis base and the decomposed polymer. Free carbon fibers are recovered by separating the carbon fibers from the admixture Comparison Examples A comparison of Examples 1 and 2 above indicates that CFRP processing time goes down and useful free fiber harvest improves with increasing Lewis base strength. The use of a weak Lewis base such as triphenylphosphine results in exfoliation of CFRP but no free fibers are obtained. FIG. 7 shows a 16-ply-thick 1 cm×1 cm piece of CFRP that was treated with triphenylphosphine that was heated to and maintained at 350° C. for 10 minutes. No free fibers were recovered. Comparison experiments performed with solutions of triphenylmethane and triphenylmethanol—compounds that are not Lewis bases—were not useful in releasing carbon fibers from CFRP. For example, a piece of 1 cm×1 cm, 16-ply-thick CFRP that was admixed in 5 g of triphenylmethane and heated at 350° C. for 10 min under N$_2$ gas resulted in the recovery of a few exfoliated plys and CFRP monolith recovery but no free fiber recovery. Triphenylmethane is a very weak acid with a pKa of 33 and does not fully exfoliate the CFRP. While pKa is a measure of Bronstead acidity instead of Lewis acidity, triphenylmethanol has all electrons in bonds and no lone pairs to donate, so it is not a Lewis base and it is not effective in recovering carbon fibers.

In another comparison experiment, a piece of 1 cm×1 cm, 16-ply-thick CFRP was admixed in 5 g of triphenylmethanol, heated to and maintained at 350° C. for 10 minutes under N$_2$ gas and then cooled. No free fibers were recovered from the admixture. Instead, the recovered monolith showed no signs of exfoliation. Triphenylmethanol is a weak acid with a $pK_a$ of 12.7.

The material cost of an ionic liquid process, a mixed ionic liquid/triphenylphosphine process, and the lower cost Lewis base process are compared below. For every pound of recovered free carbon fiber, 10-16 pounds of ionic liquid or ionic liquid/PPh3 are needed while 5 pounds of Lewis base are needed. $^{31}$P NMR shows that ~2.7 wt % of the ionic liquid decomposes during CFRP depolymerization, ~2.7% of the PPh3 in the mixed ionic liquid/PPh3 bath (PPh3 protects the ionic liquid) decomposes during CFRP depolymerization while essentially none of the Lewis base—triphenylphosphine oxide—decomposes. The estimate below assumes a loss of 1% of each depolymerization liquid during separation of epoxy residue from the bath and that the bath process would be performed every three depolymerization batches. Finally, in processes where carbon fiber is removed from the molten bath and sonicated with acetone for cleaning (acetone volume same as depolymerization bath volume), we assumed a 1% acetone loss. Using a material cost of $2/g for the ionic liquid, $0.019/g for triphenylphosphine, $0.04/g for triphenylphosphine oxide, and $0.005/g for acetone, we calculated the value of depolymerization chemical bath and acetone lost for every pound of recovered carbon fiber. The material cost calculations are reported in Table 1 below. As Table 1 demonstrates, The Lewis base process costs 945× less than the original ionic liquid process.

TABLE 1

| | 100% Ionic liquid process | 5% IL/95% PPh$_3$ process | 100% PPh$_3$=O process |
|---|---|---|---|
| Material value degraded by CFRP | $395.42 | $3.76 Only PPh$_3$ lost | $0 |
| Material value lost in post-processing | $48.82 | $2.88 Lose IL and PPh$_3$ | $0.34 |
| Acetone lost from washing carbon fiber | $0.13 | $0.13 | $0.13 |
| Total material cost per pound recovered carbon fiber | $444.37 | $6.77 | $0.47 |

Having described the invention in detail and by reference to specific embodiments thereof, it will be apparent that modifications and variations are possible without departing from the scope of the invention defined in the appended claims. More specifically, although some aspects of the present invention are identified herein as particularly advantageous, it is contemplated that the present invention is not necessarily limited to these particular aspects of the invention.

What is claimed is:

1. A method of recovering free fibers from a fiber reinforced polymer comprising
    heating a mixture comprising fiber reinforced polymer and a Lewis base to a temperature greater than 150° C. and less than the boiling point of the Lewis base to yield free fiber; and
    separating the free fiber from the mixture,
wherein the Lewis base is triphenylphosphine oxide, triphenylphosphine sulfide, triphenylphosphine, 4-(dimethylamino)phenyldiphenylphosphine, triphenylphosphine selenide, tributylphosphine oxide, tris(2-ethylhexyl)phosphine oxide, phenylbis(2,4,6-trimethylbenzoyl)phosphine oxide, trioctylphosphine oxide, triethylphosphine oxide, diphenylphosphine oxide, methyldiphenylphosphine oxide, or Lawesson's reagent, each of which is optionally substituted with one or more substituents selected from halogen, nitrate, sulfonic acid, alkyl, alkenyl, phenyl and aldehyde.

2. The method according to claim 1 wherein the heating of the mixture comprising fiber reinforced polymer and Lewis base is for a period of time sufficient to at least partially depolymerize a portion of the fiber reinforced polymer to yield free fiber.

3. The method of claim 2, wherein the separating of the free fiber from the mixture of fiber reinforced polymer and Lewis base comprises
    cooling the mixture and separating the free fiber from the mixture to yield a recycle liquid including the Lewis base and an at least partially decomposed polymer; and
    washing the free fiber.

4. The method of claim 3, wherein the washing the free fiber comprises washing the fiber reinforced polymer and Lewis base with a wash solvent to form a wash product including an at least partially soluble Lewis base and an at least partially soluble decomposed polymer.

5. The method of claim 4, wherein the wash solvent is one or more of acetone, tetrahydrofuran, ethyl acetate, toluene, alcohol, and compatible mixtures thereof.

6. The method of claim 4, further comprising extracting the Lewis base from the wash product.

7. The method of claim 6, wherein extracting the Lewis base from the wash product comprises heating the wash product to evaporate the wash solvent and then dissolving the Lewis base in a Lewis base solvent in which at least partially soluble depolymerized polymer is essentially insoluble.

8. The method of claim 4, wherein the fiber reinforced polymer and Lewis base are washed with a wash solvent to form a wash product that includes free fiber, wherein the Lewis base and the at least partially soluble decomposed polymer are each at least partially soluble in the wash solvent.

9. The method of claim 2, wherein the fiber reinforced polymer and Lewis base are heated to at least 200° C.

10. The method of claim 2, wherein the fiber reinforced polymer and Lewis base are heated for from about 10 minutes to about 120 minutes.

11. The method according to claim 1 wherein the fiber reinforced polymer and Lewis base are heated for at least about 3 hours.

12. The method according to claim 1 wherein the fiber reinforced polymer and Lewis base are heated for about 10 minutes to about 3 hours.

13. The method according to claim 1 wherein the Lewis base is triphenylphosphine oxide, triphenylphosphine sulfide, triphenylphosphine, 4-(dimethylamino)phenyldiphenylphosphine, triphenylphosphine selenide, tributylphosphine oxide, tris(2-ethylhexyl)phosphine oxide, phenylbis(2,4,6-trimethylbenzoyl)phosphine oxide, trioctylphosphine oxide, triethylphosphine oxide, diphenylphosphine oxide, or Lawesson's reagent.

14. The method according to claim 7 wherein the Lewis base solvent is hexane, cyclohexane, methyl tert-butyl ether or a mixture thereof.

15. The method according to claim 8, wherein the wash solvent is acetone, tetrahydrofuran, ethyl acetate, toluene, methanol, ethanol, propanol, isopropyl alcohol, n-butanol, t-butanol, or a mixture thereof.

16. The method according to claim 4 further comprising separating decomposed polymer from the wash product by contacting the wash product with a solvent for the decomposed polymer, wherein the solvent for the decomposed polymer is methyl ethyl ketone, methyl amyl ketone, tetrahydrofuran (THF), diethyl ether, methylene chloride, acetone, chloroform, toluene or a mixture thereof.

17. The method according to claim 1 wherein the Lewis base is triphenylphosphine sulfide or triphenylphosphine selenide.

18. The method according to claim 1 wherein the Lewis base is triphenylphosphine oxide.

19. The method of claim 2, wherein the fiber reinforced polymer and Lewis base are heated to at least 325° C.

20. A method of recovering free fibers from a fiber reinforced thermoset polymer comprising heating a mixture comprising fiber reinforced thermoset polymer and a Lewis base to a temperature greater than 150° C. and less than the boiling point of the Lewis base to yield free fiber; and separating the free fiber from the mixture, wherein the Lewis base is triphenylphosphine oxide, triphenylphosphine sulfide, triphenylphosphine, 4-(dimethylamino)phenyldiphenylphosphine, triphenylphosphine selenide, tributylphosphine oxide, tris(2-ethylhexyl)phosphine oxide, phenylbis(2,4,6-trimethylbenzoyl)phosphine oxide, trioctylphosphine oxide, triethylphosphine oxide, diphenylphosphine oxide, methyldiphenylphosphine oxide, diphenyl sulfide, or Lawesson's reagent, each of which is optionally substituted with one or more substituents selected from halogen, nitrate, sulfonic acid, alkyl, alkenyl, phenyl and aldehyde.

21. The method according to claim 20, wherein the free fibers are carbon fibers.

22. The method according to claim 20, wherein the fiber reinforced thermoset polymer is an epoxy based polymer.

23. The method according to claim 22, wherein the free fibers are carbon fibers.

* * * * *